Dec. 29, 1942.　　H. SCHNEIDER ET AL　　2,306,758
HYDRAULIC TORQUE CONVERTER
Filed April 1, 1940　　5 Sheets-Sheet 3

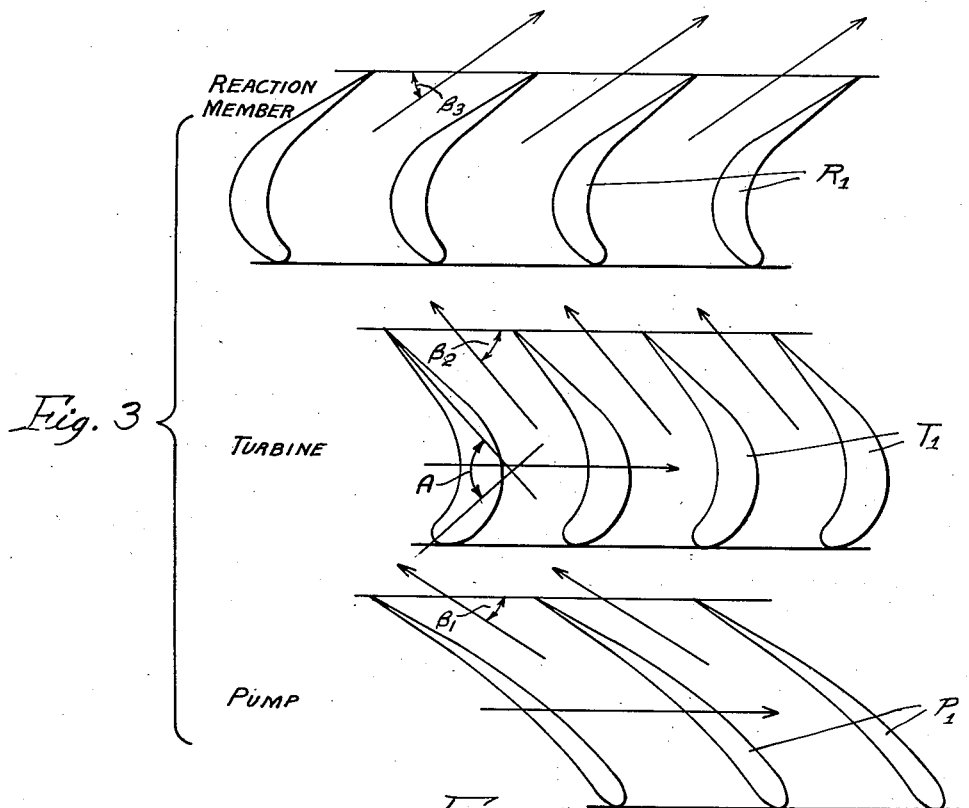
Fig. 3
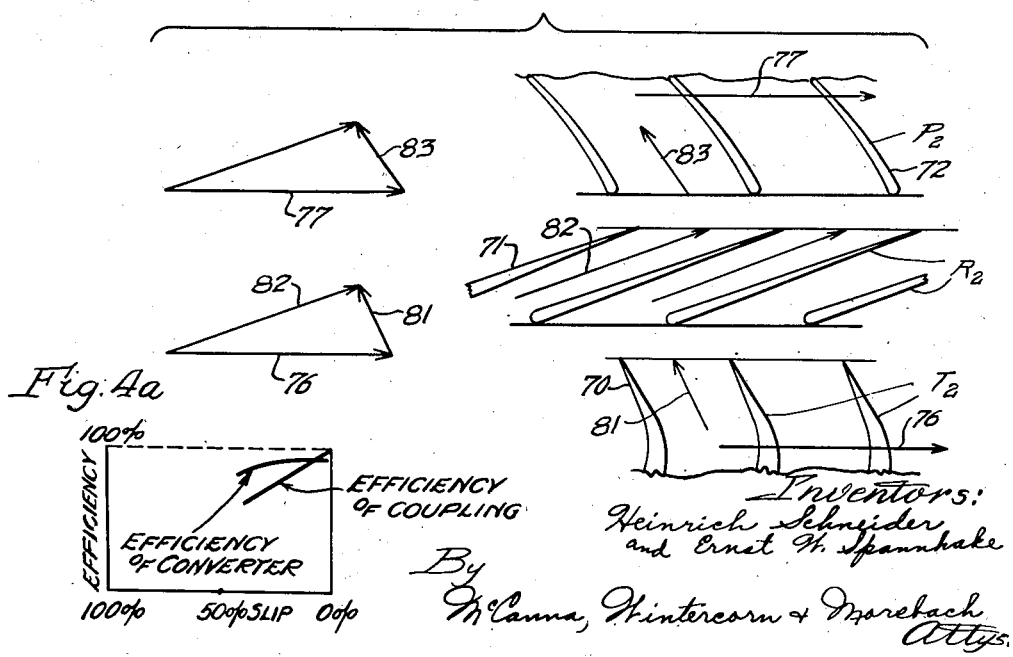
Fig. 4
Fig. 4a

Inventors:
Heinrich Schneider
and Ernst W. Spannhake
By
McCanna, Wintercorn & Morebach
Attys.

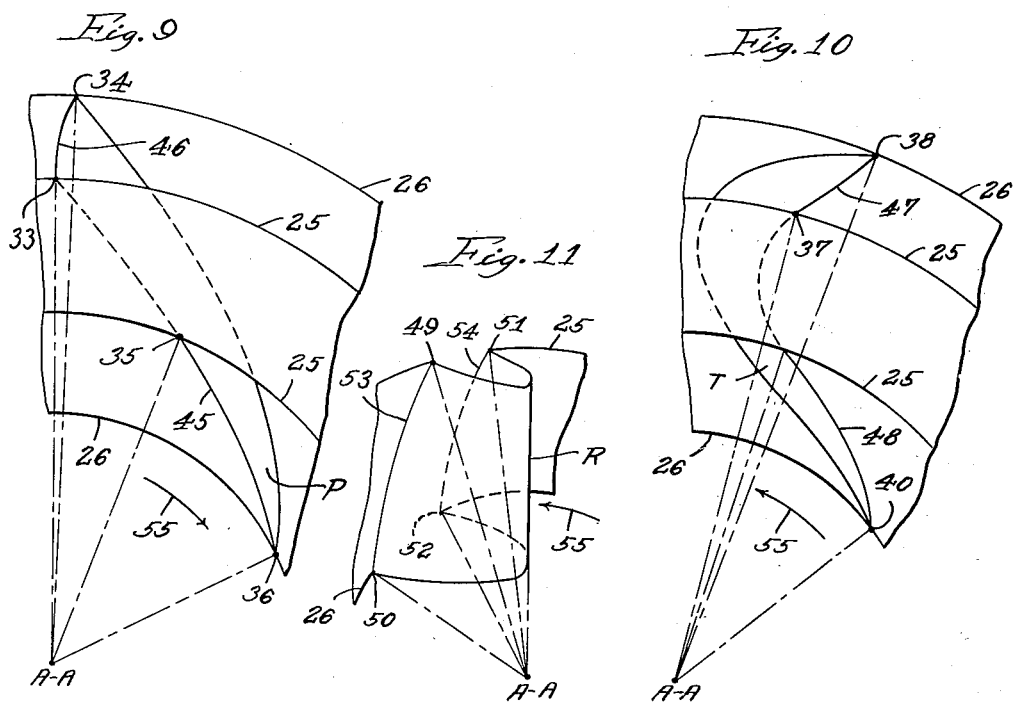
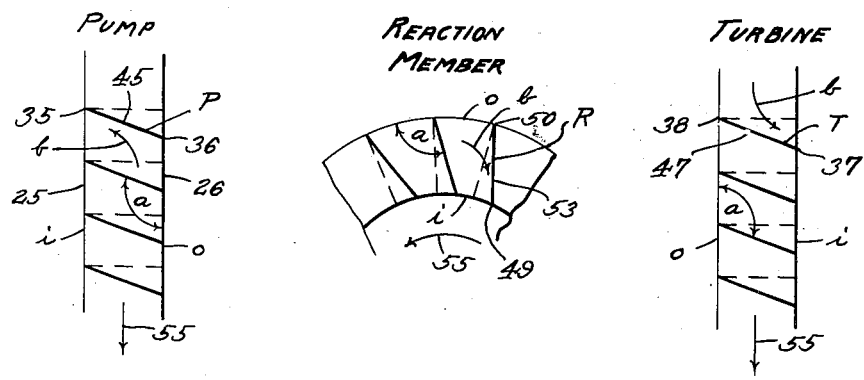

Dec. 29, 1942. H. SCHNEIDER ET AL 2,306,758
HYDRAULIC TORQUE CONVERTER
Filed April 1, 1940  5 Sheets-Sheet 5

Inventors:
Heinrich Schneider
and Ernst W. Spannhake
By
McCanna, Wintercorn & Morsbach
Attys.

Patented Dec. 29, 1942

2,306,758

UNITED STATES PATENT OFFICE 2,306,758

HYDRAULIC TORQUE CONVERTER

Heinrich Schneider and Ernst W. Spannhake, Hamilton, Ohio, assignors, by mesne assignments, to Schneider Brothers Company, a copartnership composed of Heinrich Schneider and Viva Schneider, Hamilton, Ohio, and Adolf G. Schneider and Erna Schneider, Muncie, Ind.

Application April 1, 1940, Serial No. 327,270

26 Claims. (Cl. 60—54)

This invention relates to turbo-hydraulic transmissions, and has as its general aim to provide an improved torque converter having a high efficiency over a wide speed range.

The first hydraulic torque converters have been made with a view to their use only at one fixed speed ratio at which they were supposed to have a high efficiency, the blades being designed for the particular speed specified. Manifestly, such converters cannot operate efficiently at other points in a wide range of speed ratios. Others, while realizing the difficulty, have tried to design circuit blade angles and radial ratios so as to obtain an extremely high torque ratio. These converters, however, do not give good efficiencies at high speeds. It will be appreciated that a compromise is necessary and that only a converter which, in the mean, gives highest efficiencies over the largest range of speeds, will make possible its continuous use for the drive of automotive vehicles or industrial machinery without prohibitive loss in power. This can only be achieved by overcoming the tendency of the torque converter to make the fluid flow in such a manner as to set up a large amount of hydraulic losses over a wide range of speeds. To prevent this over a large speed range presents difficult problems which it is the principal object of our invention to meet in a thoroughly practical manner.

The torque converter of our invention, as will hereinafter appear, is so designed and constructed as to direct the flow of the operating liquid in such a way that, due to the dynamics of the operating fluid alone, its path and mode of energy exchange is influenced and automatically directed in such a way that there are minimum losses in energy over a wide range of speed ratios.

Briefly stated, our invention contemplates the following improvements:

The provision of a torque converter so designed that the circulation discharge is very high when the turbine speed is zero, and from there on decreases continuously until it attains its lowest value when the turbine speed is equal to the pump speed, this being accomplished by using a converter in which the fluid flows away from the axis through the pump and toward the axis through the turbine and substantially parallel to the axis through the reaction member, and so designing and constructing the blade heads on the entrance side of the wheels that when the turbine is standing still the hydraulic losses due to churning are small.

The provision of a torque converter in which the shock losses are made a minimum for the stalling condition, where the turbine is standing still or running at low speed, by either designing and constructing the blade entrances of all three wheels to offer the least resistance to the fluid entering them at this condition, thus obtaining the best overall performance, or, on he other hand, by designing at least two of the wheels for the stalling condition when particular emphasis is placed upon high efficiencies at higher turbine speeds.

The provision of a torque converter in which the blade angles on the exit side of the wheels are methodically correlated so as to obtain the best all-around efficiency.

The provision of a torque converter in which the exit ends of the blades are given a fish-tail form instead of the well known "angular exaggeration," the latter causing an unevenness in the direction and magnitude of flow and a tendency toward detrimental turbulence, whereas the fish-tail form provided in accordance with our invention consists in an overbending of the exit portion away from the mean flow direction for the purpose of equalizing the pressure and velocity in front of and behind the vane.

The provision of a torque converter in which the blades instead of being given the same shape at the inner and outer borders, which is the conventional trend in blade design, are warped in a particular way and therefore are quite different in section at their inner and outer borders, this construction resulting in an evening up of fluid velocities within the circuit, with consequent smoother flow and generally improved operation.

The provision of a torque converter in which the turbine vanes are heavily curved, to obtain a maximum torque increase.

These improvements are in accordance with our invention preferably applied to torque converters having one, or more, or all of the following features and characteristics:

A torque converter having a substantially circular inner contour for the walls defining the vortex circuit, the outer contour being so related to the inner contour that the fluid circulating in the circuit always flows through a ring-shaped space of substantially the same cross-sectional area in the inner and outer borders of the circuit and anywhere therebetween.

A torque converter in which the bladed space in the pump or impeller wheel is exactly symmetrical to or a mirror picture of the bladed space in the turbine wheel, thus causing the primary power to come to zero when the power from the turbine shaft drops to zero at high turbine speeds and preventing heating up of the converter under coasting conditions by dissipation of the power of the engine in heat.

A torque converter having the reaction member on the smallest radius and the gap between the turbine and pump on the largest radius.

A torque converter in which the cross-section of the ducts or channels between neighboring blades has a smaller cross-section at the exit ends than at the entrance ends, thus obtaining relative acceleration of flow in each wheel and accordingly reducing friction losses to a minimum.

The invention will be better understood as reference is made in the following description to the accompanying drawings, wherein—

Fig. 3 is a diagrammatic illustration of our improved relationship between the exit angles of the three sets of blades;

Fig. 4 is a similar diagrammatic showing of three sets of blades, together with two associated velocity diagrams, this set having the blades of the reaction member at a flat angle, for a specified purpose;

Fig. 4a is a diagram showing the efficiency of a converter made with the blading of Fig. 4 in comparison with the efficiency of a hydraulic coupling, plotted in relation to slip.

Figure 14:
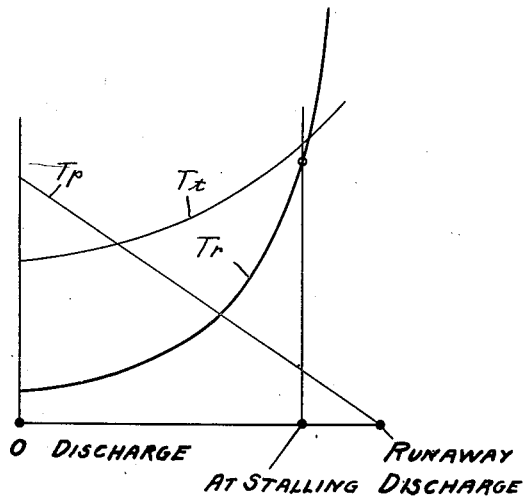
Figure 12:
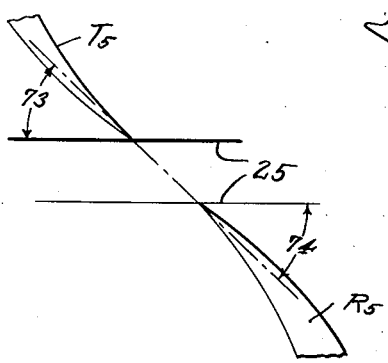
Figure 13:
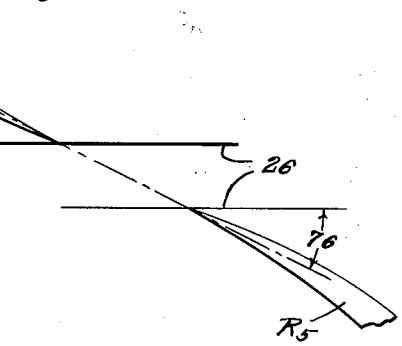

Figs. 9, 10, and 11 are diagrammatic illustrations of the warp feature as applied to the pump blades, turbine blades and reaction member blades, respectively;

Figs. 9a, 10a, and 11a are diagrammatic views related to Figs. 9, 10, and 11, respectively, showing the channel cross-section defined in each of the wheels between the blades and the outer end inner borders of the converter circuit;

Figs. 12 and 13 are diagrammatic illustrations of special relationships between turbine and reaction member blades, and Fig. 14 is a diagram showing the pump torque $T_p$, and the turbine torque $T_t$, and the torque ratio $T_r$ plotted in relation to discharge, in order to emphasize the high torque ratio obtained at stalling.

Similar reference numerals are applied to corresponding parts throughout the views.

The present invention will be better understood with an analytical discussion of the hydraulic losses in torque converters. These losses are made up of several basically different factors. The ordinary friction and whirling losses like those occurring wherever a fluid flows in a closed channel depend primarily upon the speed with which the fluid is circulated and upon the total amount of surface traversed, and these losses are larger if the fluid velocity decreases at any given point. A second hydraulic loss is that occurring at the entrance to a bladed wheel due to the fluid discharged from one wheel encountering the blades of the next wheel particularly at an awkward angle, thus producing a churning action and a consequent loss of power. This loss, which is commonly called shock loss, is expressed as the difference of the circumferential velocity of the components of the flow immediately before and after entering the wheel. A third kind of loss arises from still another interaction of two neighboring wheels and is called the fluctuation loss. Depending upon whether the flow from one wheel is from the center of the blade channel or from along the blade walls, the fluid flows at different angles and the fluctuations thereby created as one wheel brushes past the other cause a loss which is greater according to the degree of unevenness of the flow leaving the first wheel. The present invention, as previously indicated, greatly reduces some and practically eliminates others of these losses.

Figure 1:
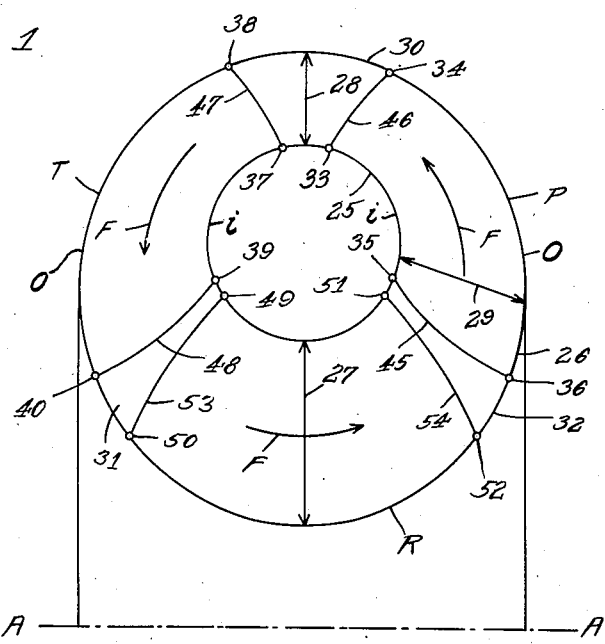
Fig. 1 is a diagrammatic illustration of a torque converter made in accordance with our invention.
Figure 2:
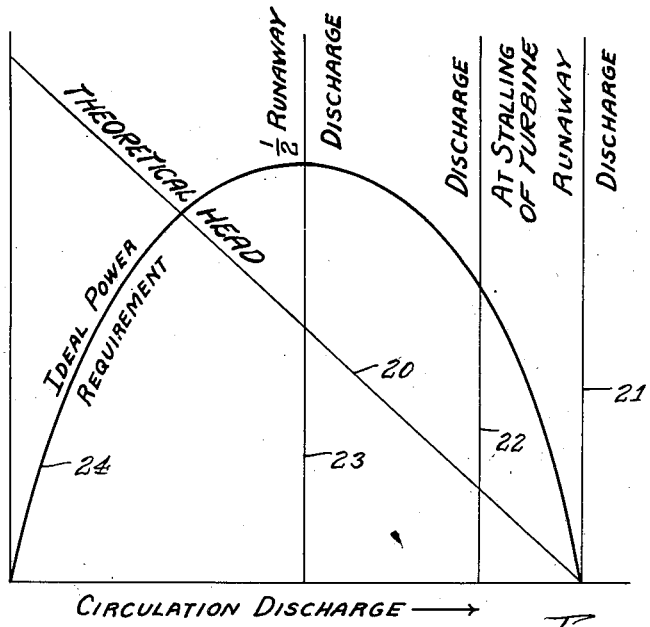
Fig. 2 is a theoretical diagram of a centrifugal pump showing the relationship between theoretical head, power requirement or horse power, and circulation discharge in a centrifugal pump of a torque converter.

Refer first to Fig. 2, which shows diagrammatically the interdependence of circulation discharge and theoretical pump head of the operating fluid for a centrifugal pump taking into account the existence of stationary vanes or ducts. The straight line 20 labeled "Theoretical head" indicates that at zero circulation discharge, the theoretical head is at a maximum, and when the circulation discharge is at a maximum the theoretical head is zero. Thus, assuming the torque converter of Fig. 1 is turning about the axis A—A, P being the pump, T the turbine and R the reaction member, Fig. 2 shows that when the fluid circulating in the pump in the direction of the arrows F has a zero velocity, the total theoretical head available to be spent either by hydraulic losses or by reconversion into mechanical energy within the turbine is a maximum and diminishes in direct proportion to increase in the fluid velocity. One of the main improvements introduced by our invention consists of the discovery that by proper design, the circulation discharge can be made to assume a maximum value when the turbine is standing still and to fall continuously as the turbine speed increases. The importance of this feature can be seen from a study of Fig. 14, which shows how high the torque ratio in the present converter is at stalling, the torque ratio being equal to the turbine torque divided by the pump torque plotted in relation to discharge. At higher discharge the torque ratio increases rapidly as it approaches the runaway discharge of the pump. Hence, the closer the stalling discharge of the converter can be brought to the runaway discharge of the pump, the higher the torque increase obtained. We have furthermore discovered that this behavior, together with other features described later, will result in maintaining a higher level of efficiency for a greater speed range. The vertical lines 21—23 in Fig. 2 labeled "Runaway discharge," "Discharge at stalling of turbine" and "½ runaway discharge," respectively, are also of interest in connection with the line 20, because they show examples of the percentages of the total theoretical head available at these different points, the line 22 intersecting the line 20 to show that when the turbine T is at a standstill there is approximately 20% of the maximum head available with the fluid at approximately 80% of the runaway discharge of the pump. Of particular significance is the parabolic curve 24 labeled "Ideal power requirement." It indicates that this reaches a maximum at ½ runaway discharge, at which point the curve intersects the line 23, and comes to zero at the runaway discharge and at zero discharge. This is of particular significance because of another inherent characteristic of the torque converter having its origin in the turbine. Every turbine has what is called a "runaway" speed, namely, a speed at which for a given circulation discharge it will not take any energy out of the operating fluid. The efficiency of the torque converter at this turbine runaway speed therefore is zero. Since there is a stationary wheel R in the circuit, some energy is lost there, which means that the pump P at this point will take a certain amount of load. The converter efficiency is zero at this point. Since this feature is unavoidable in hydraulic torque converters having stationary wheels, it is desirable to eliminate the objectionable effect of it in actual operation. This has been accomplished in our invention by specially constructing the torque converter as hereinafter described.

Most other torque converters we have observed will take at their highest turbine speeds a substantial amount of power from the prime mover without giving any secondary power in return. It is commonly known, for example, that in actual operation with conventional designs, when used, for example, in an automobile transmission, the converter starts heating up when the car is coasting, because the power of the engine is being fed into it and there is none taken out. This objectionable operation is also wasteful of fuel. Our torque converter, on the other hand, is so designed and constructed that when the power of the turbine shaft starts dropping at high turbine speeds the primary power does the same, so that no appreciable amount of power is lost.

In order that best results and high torque increase may be obtained we reduce the hydraulic losses particularly when the turbine is running at low speed or standing still. This we can do by arranging so that the shock losses will be so small that the circulation discharge will establish itself near the runaway discharge of the pump. In order to achieve this, we design and construct the blade heads at the entrances of at least two of the three wheels so that when the turbine T is standing still, the flow encounters the blade heads at such an angle that there is no churning and no shock loss. In other words, the blade entrances are preferably so designed and constructed that they offer the least resistance to the fluid entering them for the condition when the turbine is standing still or running at low speed, because by such design the hydraulic losses at low turbine speed are reduced to a minimum, the theoretical head is reduced to a minimum, and the circulation velocity at that point is increased to a maximum, and a maximum torque increase of the turbine is secured. The same absolute amount of hydraulic loss will have a proportionately greater effect on the efficiency at low turbine speeds than at high speeds, since at low speeds the available theoretical head is substantially smaller. In order to get the best overall performance with highest torque increase the shock losses must be smallest close to the stalling point. We might mention at this point that for the correct layout of the entrance angles in relation to the exit angles of the preceding wheel it is necessary to have not only a knowledge of the wheel speeds but also of the discharge velocity of the operating fluid. This information is obtainable from the above explained relationship between theoretical head and runaway discharge of the pump. Without any hydraulic losses at stalling, the circulation discharge in the converter would establish itself at this runaway discharge. In the actual case it is smaller, our tests having shown that when we design the converter for a discharge between 75% and 95% of the runaway discharge we obtain best results.

Furthermore, the exit angles of the turbine have to be substantially the same as the entrance angles of the reaction member in the same stream layer, keeping in mind, however, that this angle might vary from the inner to the outer border of the circuit so that the flow can pass from the turbine into the reaction member without shock when the turbine is at a standstill. Figs. 12 and 13 illustrate this point. In Fig. 12, at T₅ is shown the exit end of a turbine blade and at R₅ the entrance end of a reaction member blade. The angle 73 of the exit end of the turbine blade T₅ is equal to the angle 74 of the entrance end of the reaction member blade R₅ at the inner contour 25. Fig. 13 shows the outer contour portion of the same blades, and it will be noticed that the angle 75 is equal to the angle 76.

Another very important feature which contributes greatly to the efficiency of the present torque converter is that of correlating the blade angles on the exit side of all of the wheels so that the best all-around efficiency is obtained. We have found in actual tests with many different blade angles that the efficiencies of torque converters are greatly influenced by these blade angles. We have found that a very definite combination and correlation of exit angles gives the best results. Without going into involved mathematics through which this particular combination of exit angles, arrived at by extensive experiments, can be proven to give the best results, we would state briefly that most friction losses in torque converters are caused by the blading, and the present arrangement minimizes the effect of these losses upon the efficiency of the torque converter. The effect of the friction losses upon the efficiency, however, is measured by the ratio of the hydraulic losses to the theoretical head of the fluid at the different speed ratios.

For example, if the exit angles of the flow relative to each wheel are steep for the reaction member and the pump, the runaway discharge of the pump will be high, and this will make the flow relative to the walls of each wheel in the converter large and the friction losses will be high in comparison. Within the range of steep angles, therefore, the condition exists that by decreasing the reaction and pump exit angle, the effect of the friction loss upon the efficiency is decreased. If, on the other hand, the exit angles are very flat, the runaway discharge is small but the relative fluid velocity through the channels is comparatively high due to this flatness and, due to the necessity of having the blading conform to the flat flow angles, the length of the blade channel between entrance and exit of the pump and reaction member becomes large, which means an increase in the amount of hydraulic friction loss. Consequently, within the range of very flat angles, we know that steeper flow angles for pump and reaction member will decrease friction losses. There must therefore exist for a particular turbine one value of pump and reaction member exit angles which will make the friction loss effect a minimum. The very smallest value of this minimum has been found to exist if the turbine exit angle is 90°. This, however, is unsuitable because the torque ratio at stalling becomes too small. If the turbine angle is made flatter, the above-mentioned minimum of losses will be slightly higher than the one to be realized with 90° turbine blade angle, but the stalling torque ratio increases very fast. At a certain flatness of the turbine angle, this torque ratio also reaches a maximum since beyond a certain value of this turbine angle the increasing friction losses prevent its further increase. A value of the turbine angle slightly steeper than the one creating the maximum stalling torque ratio has been found to result in the optimum desired overall performance. The limits of 30° to 50° for the exit angle of the pump blades $P_1$ were determined for the best conditions for overall performance, and in like manner the limits of 30° to 50° for the turbine blades $T_1$, and 25° to 45° for the reaction member blades $R_1$, Fig. 3 illustrating the relationship diagrammatically. In a torque converter of a given profile size, a high power capacity and a maximum torque increase can be obtained by curving the turbine vanes as much as possible, without going to impractical curvature, which would increase the flow and friction losses. We have found that turbine blades having an angle formed by the entrance and exit portion between 60° and 120° give best results, and an angle of approximately 90° is most suitable, as indicated at A.

Figure 5:
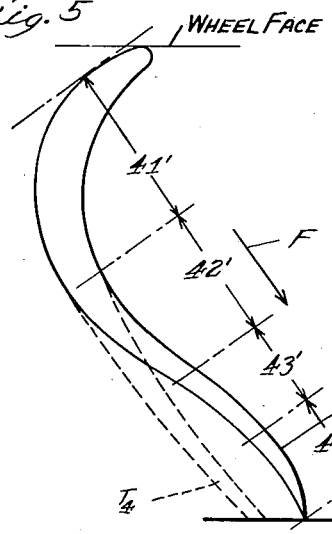
Figs. 5 and 6 are diagrams of a turbine blade and pump blade, illustrating in full lines the overbending and underbending feature and in contrast thereto in dotted lines the conventional shaping.
Figure 6:
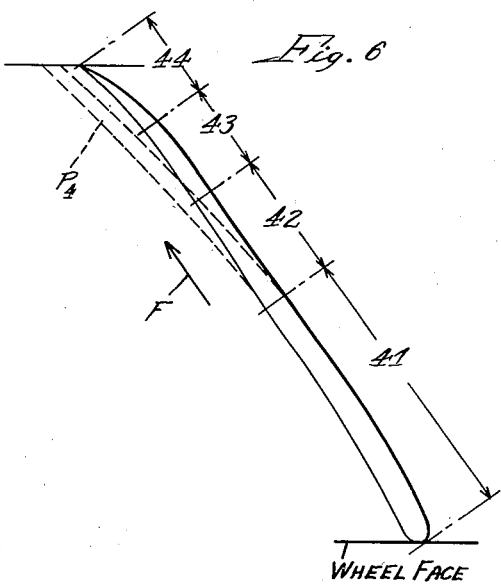
Figure 7:
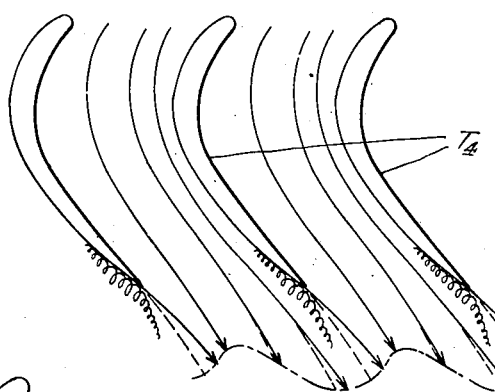
Figs. 7 and 8 are views related to Fig. 5, Fig. 8 showing the improved performance of the overbent and underbent blade and Fig. 7 the objectionable performance obtained by the conventional blade ends.
Figure 8:
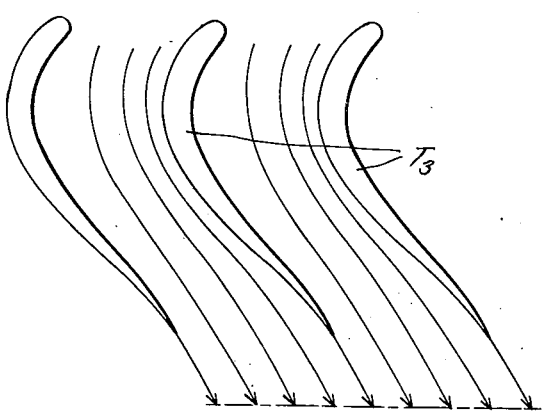

Fluctuation losses we have found can be practically entirely eliminated by making the discharge from each wheel as uniform as possible, as to direction, velocity and pressure in each stream layer. It is well known that the ordinary unevenness is caused by and depends upon the change of moment of momentum imposed upon the fluid by the blades. If this change is taking place up to the exit portions of the blades, the unevenness is especially marked. It is therefore necessary to obtain most of the moment of momentum change of the flow on the blades at points ahead of the exit portions, and we have found that the practical way of doing this is to shape those portions of the blades so as to give to a fluid particle flowing along their surfaces with the mean speed of the fluid mass to be deflected a moment of momentum change greater than the one desired at the exit portions and to shape the exit portions in such a way that the fluid particle of the kind mentioned will settle back into the desired moment of momentum change and stay there from that point on. If this principle is followed, pressures and velocities are equalized on both sides of the blades just before the trailing edge and the tendency for change in direction of the stream lines coming from near the blade walls after passing the trailing edge is greatly reduced. The turbulence obtained with blades $T_4$ of conventional form is illustrated in Fig. 7, and the improved performance obtainable with blades $T_3$ shaped in accordance with our invention is illustrated in Fig. 8, the condition of turbulence illustrated in Fig. 7 being absent in Fig. 8. If the blade load is particularly heavy, in order to obtain greater evenness of discharge, we shape the exit portions of the blades after the over-bending with a certain under-bending so that the fluid particle mentioned before leaves the wheel at a smaller moment of momentum change. This results in the exit half of each blade having an over and underbent shape, as illustrated in full lines at $T_3$ in Fig. 5, the blade there shown being a turbine blade, as well as in Fig. 8. The contrast between this over and underbent blade and the conventional shaped blade is exaggerated in this diagrammatic view by showing the exit half of a conventional blade in dotted lines at $T_4$. This view, Fig. 5, is in other words a direct comparison of the blades shown in Figs. 7 and 8. In a similar manner, Fig. 6 illustrates a pump blade with an over and underbent exit portion $P_3$, this diagrammatic view including in dotted lines a showing of a conventional blade shape at $P_4$. The direction of fluid flow in the two views is indicated by the arrows F. The entrance portions 41 and 41' of the two blades are of conventional shape, but the portions 42 and 42' are over-bent so as to give the higher moment of momentum change. The next portions 43 and 43' are shaped for transition back to the desired moment of momentum, but the exit portions 44 and 44' are shaped for a decrease in moment of momentum. The portions 44 and 44' may be made of a different material than the rest of these blades having a certain desired flexibility and resilience so that these portions will be free to deflect in such a way that a minimum of pressure difference is created near the trailing edges.

In the preceding description of the various features of our invention, we have dealt as a matter of course with mean value of flow in the fluid filled spaces of the converter. It is a well known fact, however, that whereas the mean flow of a bladed wheel will have certain properties which in general determined the energy transfer and the main friction losses incurred in the wheel, there exist within the wheel itself important deviations below and above the average flow properties that will influence considerably the behavior of individual portions of the total flow. An important group of these deviations are due to the annular shape of the converter profile. Except as influenced by the blades, the circulation velocity at the inner border 25 (Fig. 1) would be higher than at the outer border 26, thus preventing proper utilization of the outer portions of the converter wheels and giving rise to excessively high velocities through the inner portions. These velocity differences become especially detrimental when the radii of curvature of the circuit are small and the distance between the inner and outer borders is large. We have found that the difficulty mentioned can be corrected by a particular warping of the blades to equalize the velocity distribution between the inner and outer borders as much as possible. Figs. 9 to 11 and related Figs. 9a to 11a illustrate this phase of our invention diagrammatically and should be read in connection with Fig. 1 for a better understanding. In Fig. 1 the outer border is designated $o$ and the inner border $i$ to correspond with the marking of these borders in Figs. 9a to 11a. The pump blades P are bounded by the points 33—36, 45 being the entrance edge and 46 the exit edge. The entrance edge 45 has its inner tip 35 on the inner contour 25 and the outer tip 36 on the outer contour 26. The exit edge 46 has its inner tip 33 on the inner contour 25 and its outer tip 34 on the outer contour 26. The entrance edge 45 has the outer tip 36 lying ahead of the inner tip 35 in relation to the direction of rotation, and the same is true of the exit edge 46, its outer tip 34 lying ahead of the inner tip 33. The turbine blades T are bounded by the points 37—40. The entrance edge 47 has its outer tip 38 lying behind the inner tip 37 in relation to the direction of rotation, and the exit edge 48 has its outer tip 40 lying behind the inner tip 39. The reaction member blades R are bounded by the four points 49—52, 53 being the entrance edge and 54 the exit edge. The entrance edge 53 has its outer tip 50 lying ahead of the inner tip 49 in relation to the direction of rotation, and the exit edge 54 has its outer tip 52 also lying ahead of the inner tip 51. The arrow 55 indicates the direction of rotation about the axis A—A in each of the three views, Figs. 9 to 11. By warping the blades in the manner shown and inclining the entrance and exit edges in relation to the radii, fluid velocities within the wheel itself are evened up and smoother and more efficient flow results. In Figs. 9a to 11a the conventional rectangular cross-section of the channels of the wheels is indicated in dotted lines, but in accordance with our invention the channel cross-sections are of non-rectangular parallelogram form in order to have the pressure face of each blade form an angle $a$ of more than 90° with the outer contour wall. This warping or inclination of the blades with reference to the adjacent contour walls tends to increase the pressure adjacent the inner border as indicated by the arrow $b$ in each instance and accordingly equalize pressure and velocities over the channel section.

In conclusion, it is generally appreciated by those skilled in this art that if the relative velocity in each wheel of a torque converter is made larger at the exit than at the entrance, thus causing an acceleration of the fluid through each wheel, the friction losses will be lower. Our invention is well adapted for and there is nothing inconsistent in any of its features with having this relative acceleration in every wheel by making the cross-sectional area of each duct or channel between neighboring blades of smaller cross-section at the exit than at the entrance, whereby to further increase the efficiency of our torque converter.

In some applications a converter is wanted which has essentially the properties of a hydraulic coupling at high turbine speeds with small torque increase requirement and differs primarily from this coupling with respect to its primary load characteristics, which at stalling will not increase to the extreme values customary with these hydraulic couplings, and with respect to its efficiency which for a limiting speed range will stay substantially constant regardless of the slip, whereas in the above-mentioned couplings it falls proportionally as the slip increases. See Fig. 4a. This can be realized by designing the blade channel of the reaction member in such a manner that the mean velocity of the flow would not suffer any change of moment of momentum from the entrance to the exit and to give these blades such a direction as to intercept smoothly the flow coming out of the turbine for a circulation discharge which will give both to pump and turbine subtantially the same torque. Since from previous consideration, it is apparent that this discharge is relatively small, the angles of such reaction member blades with the circumferential direction will also be comparatively small. In Fig. 4 such an arrangement is shown diagrammatically and Fig. 4a shows the efficiency of a converter made with the blading of Fig. 4 in comparison with the efficiency of a hydraulic coupling, plotted in relation to slip. The exit ends 70 of the turbine blades T₂ moving with a speed indicated by arrow 76 as to direction and magnitude create a flow relative to themselves moving with a speed indicated by arrow 81 as to direction and magnitude. This gives rise to the flow relative to the reaction member blades R₂ indicated by arrow 82, which is the geometric sum of 76 and 81 as can be seen from the velocity triangle on the left of the figure. This flow does not change its direction when flowing through reaction member blades 71.

The pump blades P₂ whose entrance ends are indicated by the numeral 72 and move only slightly faster than the turbine blade edges as indicated by arrow 77 are so shaped as to intercept smoothly this flow which has the relative direction in regard to themselves as indicated by arrow 83. The angle which the latter makes with the circumferential direction as can be seen from the accompanying velocity triangle will only be slightly flatter than the corresponding angle of the relative turbine exit flow 81 since the magnitude of 77 is only slightly larger than 76. This picture represents actual conditions truly enough since, first of all, entrance and exit radius of the reaction member are alike indicating that if the direction of the flow is unchanged, its moment of momentum will stay unchanged also, and since furthermore the exit radius of pump being equal to the entrance radius of the turbine equal angular speed of these two members will mean equal rotating velocity for each streamlayer. Thus a condition is created where for a high turbine speed the shock losses are reduced to zero. In the reaction member, of course, the relative velocity is comparatively high due to the flat blade angle but here the blade space can be reduced far enough as to make the total friction surface of the blade channels comparatively small. Thus extremely high efficiencies will be realized at high turbine speeds.

It is believed the foregoing description conveys a good understanding of the objects and advantages of our invention. The appended claims have been drawn with a view to covering all legitimate modifications and adaptations.

We claim:

1. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels in such a way that the angle of said entrance portions substantially corresponds to the resultant discharge angle of the flow from the associated exit portions for smoothly receiving the fluid without substantial shock losses when the turbine is standing still or moving slowly and when the circulation discharge is about 75% or more of the runaway discharge of the pump.

2. A torque converter comprising rotatable pump and turbine wheels and a relatively stationary reaction wheel, said wheels having intercommunicating bladed channels defined between inner and outer contour walls for the circulation of a fluid medium, the inner contour defined by the inner contour walls of the three wheels being substantially circular in transverse section as well as in longitudinal section, said converter having at least two of the wheels with the entrance portion of their blades angularly disposed with relation to the adjoining exit portions of the blades on the other wheels in such a way that the angle of said entrance portions substantially corresponds to the resultant discharge angle of the flow from the associated exit portions for smoothly receiving the fluid without substantial shock losses when the turbine is standing still or moving slowly and when the circulation discharge is about 75% or more of the runaway discharge of the pump.

3. A torque converter comprising rotatable pump and turbine wheels and a relatively stationary reaction wheel, said wheels having intercommunicating bladed channels defined between inner and outer contour walls for the circulation of a fluid medium, said outer contour being so displaced radially in relation to the inner contour toward the axis of rotation of said torque converter that the total cross-sectional area of the fluid passage of the circuit measured on the inner side of said circuit is substantially equal to the total cross-sectional area measured at the outer portion of said circuit, the total cross-sectional area measured at all points between said extremes being also substantially equivalent, said converter having at least two of the wheels with the entrance portion of their blades angularly disposed with relation to the adjoining exit portions of the blades on the other wheels in such a way that the angle of said entrance portions substantially corresponds to the resultant discharge angle of the flow from the associated exit portions for smoothly receiving the fluid when the turbine is standing still or moving slowly and when the circulation discharge is about 75% or more of the runaway discharge of the pump.

4. A torque converter comprising rotatable pump and turbine wheels and a relatively stationary reaction wheel, said wheels having intercommunicating bladed channels defined between inner and outer contour walls for the circulation of a fluid medium, at least two of the wheels having the entrance portions of their blades angularly disposed with relation to the adjoining exit portions of the blades on the other wheels in such a way that the angle of said entrance portions substantially corresponds to the resultant discharge angle of the flow from the associated exit portions for smoothly receiving the fluid when the turbine is standing still or moving slowly with the circulation discharge near the runaway discharge of the pump, the blades in each of said wheels forming in combination certain mean angles with the circumferential direction, the angle of the exit portion of the pump blades being not less than 30° nor more than 50° inclined counter to the direction of rotation, the angle of the exit portion of the turbine blades being not less than 30° nor more than 50° inclined counter to the direction of rotation, and the angle of the exit portion of the reaction wheel blades being not less than 25° nor more than 45° inclined toward the direction of rotation of the torque converter.

5. A torque converter comprising rotatable pump and turbine wheels and a relatively stationary reaction wheel, said wheels having intercommunicating bladed channels defined between inner and outer contour walls for the circulation of a fluid medium, at least two of the wheels having the entrance portions of their blades angularly disposed with relation to the adjoining exit portions of the blades on the other wheels in such a way that the angle of said entrance portions substantially corresponds to the resultant discharge angle of the flow from the associated exit portions for smoothly receiving the fluid when the turbine is standing still or moving slowly with the circulation discharge near the runaway discharge of the pump, the blades in each of said wheels forming in combination certain angles in their mean section between outer and inner borders with the direction of rotation, the angle of the exit portion of the pump blades being approximately 32° inclined counter to the direction of rotation, the angle of the exit portion of the turbine blades being approximately 50° inclined counter to the direction of rotation, and the angle of the exit portion of the reaction wheel blades being approximately 35° inclined toward the direction of rotation of the torque converter.

6. A torque converter comprising rotatable pump and turbine wheels and a relatively stationary reaction wheel, said wheels having intercommunicating bladed channels defined between inner and outer contour walls for the circulation of a fluid medium, the entrance portions of the blades of each of said wheels being angularly disposed with relation to the adjoining exit portions of the blades on the other wheels so that the entrance angle corresponds substantially to the resultant discharge angle of the associated exit portions, whereby to intercept the discharge from said exit portions with minimized shock loss when the turbine wheel is stationary or moving slowly in relation to the rotation of the pump wheel.

7. A torque converter comprising rotatable pump and turbine wheels and a relatively stationary reaction wheel, said wheels having intercommunicating bladed channels defined between inner and outer contour walls for the circulation of a fluid medium, said wheels being so related that the fluid flow is substantially radially outwardly through the pump, substantially radially inwardly through the turbine and substantially parallel to the axis in the reaction wheel, the bladed space of said reaction member being substantially smaller than the bladed space of either turbine and pump, the reaction member having substantially flat blades which are inclined in the direction of rotation of the pump at a small angle relative to a plane normal to the axis of rotation, the pump blades furthermore having entrance portions which are inclined relative to the direction of rotation at an angle equal to or slightly flatter than the corresponding turbine blade exit angles for each streamlayer.

8. A turbohydraulic wheel with blades having their exit halves inclined for overbending of the flow in relation to the total moment of momentum change imposed by the wheel upon said flow up to a point near the exit edge and having the exit edge portions inclined for underbending the flow in relation to the same moment of momentum change, whereby to reduce fluctuation losses, said exit edge portions representing a small fraction of the overall length of said blades.

9. A torque converter comprising rotatable bladed pump and turbine wheels and a bladed stationary reaction wheel, the blades of said wheels having their exit halves inclined for overbending of the flow in relation to the exit angle of the mean flow leaving the wheel up to a point near the exit edge, and having only the exit edge portions inclined in the opposite direction for underbending the flow in relation to the same angle, whereby to reduce fluctuation losses.

10. A torque converter comprising rotatable bladed pump and turbine wheels and a bladed stationary reaction wheel, the turbine and reaction wheels both having the blades thereof ending in exit portions shaped for first overbending the flow at a point removed from the exit edges of said blades and then underbending the flow at the relatively short exit edge portions, whereby to reduce fluctuation losses.

11. A torque converter comprising rotatable bladed pump and turbine wheels and a bladed stationary reaction wheel, the blades of each of said wheels being warped helix-wise so as to reduce the difference of the circulation velocities on the outer and inner profile contours and terminating so that the reaction wheel blades have their outer tips lying ahead of the inner ones in relation to the direction of rotation of the pump, and the turbine wheel blades have their outer tips lying behind the inner ones in relation to the direction of rotation of the turbine wheel.

12. A hydraulic torque converter consisting of a pump, a turbine and a stationary reaction member, each of said members defining flow channels of non-rectangular parallelogram section between the blades thereof and the inner and outer contour walls thereof, the blades being warped in such a way that the pressure face of each blade makes an angle of more than 90° with the outer contour wall.

13. A torque converter comprising a bladed impeller member, a bladed turbine member, and a bladed reaction member, said members disposed in intercommunicating relation for the circulation of a fluid medium, the blades of at least two of these members having their entrance portions angularly disposed with relation to the exit portions of adjoining blades in such a way that the angle of said entrance portions substantially corresponds to the resultant discharge angle of the flow from the associated exit portions to induce high fluid circulation at low R. P. M. of the turbine member, and the blades of the turbine member being relatively heavily curved so that the included angle between the entrance and exit portions of each of said blades is about 90°, whereby to obtain high torque.

14. A torque converter as set forth in claim 7, wherein the exit portion of the blades is bent in relation to the preceding portion of the blades to cause a change of moment of momentum in the flow close to the exit and equalize the pressure and velocity of the fluid on opposite sides of the blade at the exit.

15. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, said converter also having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses.

16. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, the blades of each wheel being warped helix-wise so as to reduce the difference of the circulation velocities on the outer and inner profile contours and terminating so that the reaction wheel blades have their outer tips lying ahead of the inner ones in relation to the direction of rotation of the pump, and the blades of the turbine wheel have their outer tips lying behind the inner ones in relation to the direction of rotation of the turbine wheel.

17. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, said converter having the blades of at least two of the wheels formed with their exit halves inclined for overbending of the flow in relation to the total moment of momentum change imposed by the wheels upon said flow up to a point near the exit edge, and having their exit edge portions inclined for underbending the flow in relation to the same moment of momentum change, whereby to reduce fluctuation losses, the blades of each wheel being warped helix-wise so as to reduce the difference of the circulation velocities on the outer and inner profile contours and terminating so that the reaction wheel blades have their outer tips lying ahead of the inner ones in relation to the direction of rotation of the pump, and the blades of the turbine wheel have their outer tips lying behind the inner ones in relation to the direction of rotation of the turbine wheel.

18. A torque converter comprising rotatable pump and turbine wheels and a relatively stationary reaction wheel, said wheels having intercommunicating bladed channels defined between inner and outer contour walls for the circulation of a fluid medium, said wheels being so related that the fluid flow is substantially radially outwardly through the pump, substantially radially inwardly through the turbine and substantially parallel to the axis in the reaction wheel, the bladed space of said reaction member being substantially smaller than the bladed space of either turbine or pump, the reaction member having blades which are inclined in the direction of rotation of the pump at a small angle relative to a plane normal to the axis of rotation, the pump blades furthermore having entrance portions which are inclined relative to the direction of rotation at an angle equal to or slightly flatter than the corresponding turbine blade exit angles for each streamlayer, said converter also having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses.

19. A torque converter comprising rotatable pump and turbine wheels and a relatively stationary reaction wheel, said wheels having intercommunicating bladed channels defined between inner and outer contour walls for the circulation of a fluid medium, said wheels being so related that the fluid flow is substantially radially outwardly through the pump, substantially radially inwardly through the turbine and substantially parallel to the axis in the reaction wheel, the bladed space of said reaction member being substantially smaller than the bladed space of either turbine or pump, the reaction member having blades which are inclined in the direction of rotation of the pump at a small angle relative to a plane normal to the axis of rotation, the pump blades furthermore having entrance portions which are inclined relative to the direction of rotation at an angle equal to or slightly flatter than the corresponding turbine blade exit angles for each streamlayer, the blades of each wheel being warped helix-wise so as to reduce the difference of the circulation velocities on the outer and inner profile contours and terminating so that the reaction wheel blades have their outer tips lying ahead of the inner ones in relation to the direction of rotation of the pump, and the blades of the turbine wheel have their outer tips lying behind the inner ones in relation to the direction of rotation of the turbine wheel.

20. A torque converter comprising rotatable pump and turbine wheels and a relatively stationary reaction wheel, said wheels having intercommunicating bladed channels defined between inner and outer contour walls for the circulation of a fluid medium, said wheels being so related that the fluid flow is substantially radially outwardly through the pump, substantially radially inwardly through the turbine and substantially parallel to the axis in the reaction wheel, the bladed space of said reaction member being substantially smaller than the bladed space of either turbine or pump, the reaction member having blades which are inclined in the direction of rotation of the pump at a small angle relative to a plane normal to the axis of rotation, the pump blades furthermore having entrance portions which are inclined relative to the direction of rotation at an angle equal to or slightly flatter than the corresponding turbine blade exit angles for each streamlayer, said converter having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses, the blades of each wheel being warped helix-wise so as to reduce the difference of the circulation velocities on the outer and inner profile contours and terminating so that the reaction wheel blades have their outer tips lying ahead of the inner ones in relation to the direction of rotation of the pump, and the blades of the turbine wheel have their outer tips lying behind the inner ones in relation to the direction of rotation of the turbine wheel.

21. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, said converter also having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses, said blades having their exit portions made of a material having sufficient flexibility and resilience in relation to the remaining portions of said blades to conform readily to the discharge flow and to equalize the pressure and velocity on opposite sides of said exit edge portions.

22. A torque converter comprising rotatable pump and turbine wheels and a relatively stationary reaction wheel, said wheels having intercommunicating bladed channels defined between inner and outer contour walls for the circulation of a fluid medium, said wheels being so related that the fluid flow is substantially radially outwardly through the pump, substantially radially inwardly through the turbine and substantially parallel to the axis in the reaction wheel, the bladed space of said reaction member being substantially smaller than the bladed space of either turbine or pump, the reaction member having blades which are inclined in the direction of rotation of the pump at a small angle relative to a plane normal to the axis of rotation, the pump blades furthermore having entrance portions which are inclined relative to the direction of rotation at an angle equal to or slightly flatter than the corresponding turbine blade exit angles for each streamlayer, said converter also having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses, said blades having their exit portions made of a material having sufficient flexibility and resilience in relation to the remaining portions of said blades to conform readily to the discharge flow and to equalize the pressure and velocity on opposite sides of said exit edge portions.

23. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, said converter also having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change, whereby to reduce fluctuation losses, the blades of the turbine wheel being relatively heavily curved so that the included angle between the entrance and exit portions of each of said blades is about 90° whereby to obtain high torque.

24. A torque converter comprising rotatable bladed pump and turbine wheels and a bladed stationary reaction wheel, said converter having at least two of the wheels with the entrance portion of their blades angularly disposed with relation to the adjoining exit portions of the blades on the other wheels for smoothly receiving the fluid when the turbine is standing still or moving slowly with the circulation discharge between approximately 75% and 95% of the runaway discharge of the pump, the blades of each wheel being warped helix-wise so as to reduce the difference of the circulation velocities on the outer and inner profile contours and terminating so that the reaction wheel blades have their outer tips lying ahead of the inner ones in relation to the direction of rotation of the pump, and the blades of the turbine wheel have their outer tips lying behind the inner ones in relation to the direction of rotation of the turbine wheel, the blades of the turbine wheel being relatively heavily curved so that the included angle between the entrance and exit portions of each of said blades is about 90° whereby to obtain high torque.

25. A torque converter comprising rotatable bladed pump and turbine wheels and a bladed stationary reaction wheel, said converter having at least two of the wheels with the entrance portions of their blades angularly disposed with relation to the adjoining exit portions of the blades on the other wheels in such a way that the angle of said entrance portions substantially corresponds to the resultant discharge angle of the flow from the associated exit portions for smoothly receiving the fluid without substantial shock losses when the turbine is standing still or moving slowly.

26. A torque converter comprising rotatable bladed pump and turbine wheels and a bladed stationary reaction wheel, said converter having the blades of at least two of the wheels formed with their exit halves inclined for overbending of the flow in relation to the total moment of momentum change imposed by the wheels upon said flow up to a point near the exit edge, and having the exit edge portions inclined for underbending the flow in relation to the same moment of momentum change whereby to reduce fluctuation losses, said blades having their exit portions made of a material having sufficient flexibility and resilience in relation to the remaining portions of said blades to conform readily to the discharge flow and to equalize the pressure and velocity on opposite sides of said exit edge portions.

HEINRICH SCHNEIDER.
ERNST W. SPANNHAKE.

CERTIFICATE OF CORRECTION.

Patent No. 2,306,758. December 29, 1942.

HEINRICH SCHNEIDER, ET AL.

It is hereby certified that error appears in the printed specification of the above numbered patent requiring correction as follows: Page 6, first column, line 32, claim 3, after "fluid" insert the words --without substantial shock losses--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.